R. Lighthall,

Coating Metal.

No. 4048. Reissued June 28. 1870.

Witnesses:
Fred. Haines
M Cornely

Reuben Lighthall
per Brown Cornelius & Co
Attorneys

UNITED STATES PATENT OFFICE.

CORNELIUS GODFREY, OF NEW YORK, AND REUBEN LIGHTHALL, OF BROOKLYN, N. Y., ASSIGNEES OF REUBEN LIGHTHALL.

IMPROVEMENT IN PREVENTING THE CORROSION OF IRON EXPOSED TO WATER OR DAMPNESS.

Specification forming part of Letters Patent No. 97,657, dated December 7, 1869; Reissue No. 4,048, dated June 28, 1870.

*To all whom it may concern:*

Be it known that I, REUBEN LIGHTHALL, of the city of Brooklyn, in the county of Kings and State of New York, have invented a new and Improved Mode of Preventing Corrosion of Iron Exposed to Water or Dampness; and I do hereby declare that the following is a full, clear, and exact description of the same, reference being had to the accompanying drawings, forming part of this specification.

The oxidation and corrosion to which iron is subject when in contact with water, more especially salt-water, are the cause of serious deterioration of the structures of which it forms the whole or part, and this is more especially the case when such oxidation or corrosion is promoted or augmented by a certain galvanic action arising from the presence of another metal or other metals with which the iron forms an electric battery, in which the iron forms the electro-positive element and the other metal or metals form the electro-negative element, for in such case the oxygen of the water is set free in immediate contact with the iron, with which it enters into combination to form the oxide of iron, thereby causing the corrosion and loss of the iron. This oxidation from the above or any other cause dependent upon the presence of water in contact with the iron it is the object of this invention to prevent; and my invention consists in effecting this object by connecting with the iron a metal or combination of metals or alloy which shall be electro-positive with reference to iron—such, for instance, as zinc or alloys of zinc with tin or other metals.

The applications which are capable of being made of the invention are numerous and varied. Among the many structures and articles to which it may be applied may be mentioned iron ships or the iron sheathing of other vessels; also to iron pipes exposed to water or to moisture or dampness.

Many modifications will be necessary in the application of the invention, according to the nature, form, or exposure of the articles or structures to which it is applied; but it may be said generally that the electro-positive metal may be applied in the form of couplings, plugs, bolts, spikes, nails, rivets, collars or sleeves, and the like.

Figure 1:
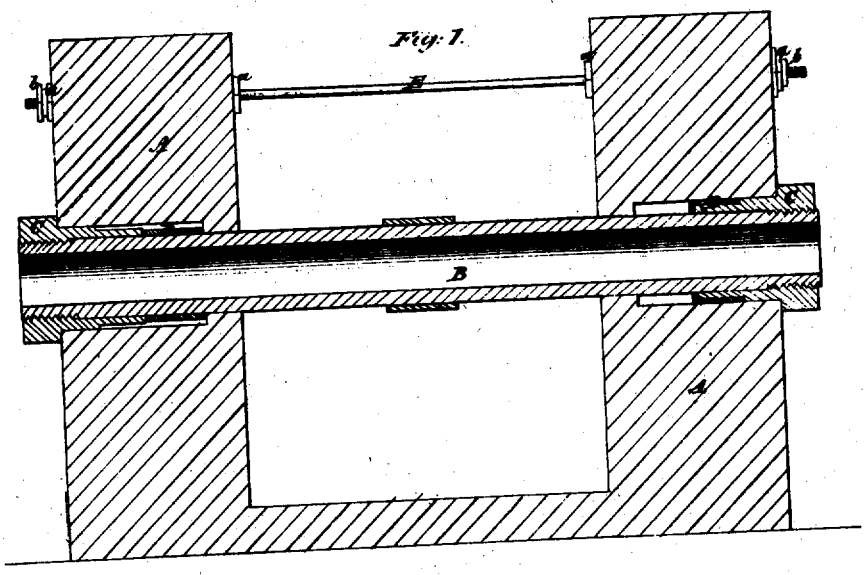
Figure 2:
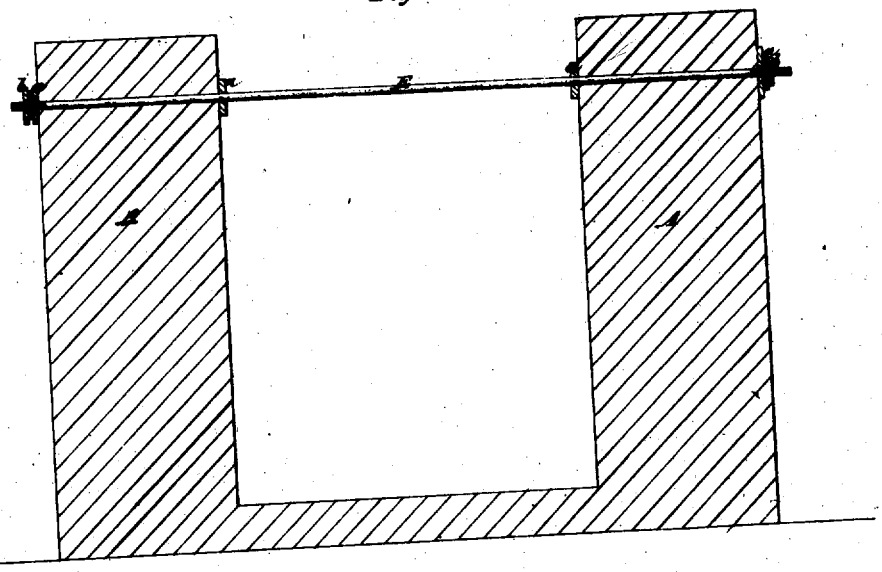

As a simple illustration of the application of my invention, I have represented in the accompanying drawings, Figures 1 and 2, sectional views of portions of a surface-condenser.

Similar letters of reference indicate corresponding parts where they occur in both figures.

A A represent the walls of the condenser. B represents one of its iron pipes, and E one of its bolts which it is desired to protect. The pipe B is represented as having connected with each end, by screwing onto it, a nut, C, of zinc or other metal which is electro-positive relatively to iron, and as having fitted to it sleeves D of a similar electro-positive character. These sleeves and nuts need not both be applied together, but are represented to illustrate different modes of applying my invention.

What is here claimed, and desired to be secured by Letters Patent, is—

The combination with or application to iron surfaces or bodies exposed to the action of fresh or salt water or moisture of a metal or metals or alloy, in the manner and for the purpose substantially as herein set forth.

REUBEN LIGHTHALL.

Witnesses:

FRED. HAYNES,

FERD. TUSCH.